United States Patent [19]

Tsumura et al.

[11] Patent Number: 4,570,060

[45] Date of Patent: Feb. 11, 1986

[54] FOLLOW-UP GUIDANCE AND INFORMATION TRANSFER SYSTEM FOR A MOVING OBJECT ON THE GROUND USING THE LIGHT BEAM

[75] Inventors: Toshihiro Tsumura, Osaka; Shigeki Kamei, Nishinomiya; Hiroji Waratani, Anamushi; Akira Takahashi, Saitama, all of Japan

[73] Assignees: Hitachi Kidenkogyo Kabushiki Kaisha, Hyogo; Yagiantena Kabushiki Kaisha, Tokyo, both of Japan

[21] Appl. No.: 490,418

[22] Filed: May 2, 1983

[30] Foreign Application Priority Data

May 1, 1982 [JP] Japan .................................. 57-074291

[51] Int. Cl.$^4$ ................................................ G01J 1/20
[52] U.S. Cl. ................................. 250/203 R; 250/234
[58] Field of Search ........................ 180/167, 168, 169; 250/202, 203 R, 234, 235, 236; 350/102; 455/604–606, 609, 616, 617

[56] References Cited

U.S. PATENT DOCUMENTS

| | | | |
|---|---|---|---|
| 3,437,815 | 4/1969 | Bleicher | 250/203 R |
| 3,566,126 | 2/1971 | Lang | 455/616 |
| 3,952,208 | 4/1976 | Desvignes et al. | 250/203 R |
| 3,995,792 | 12/1976 | Otto et al. | 250/203 R |
| 4,096,380 | 6/1978 | Eichweber | 350/102 |

*Primary Examiner*—David C. Nelms
*Attorney, Agent, or Firm*—Armstrong, Nikaido, Marmelstein & Kubovcik

[57] ABSTRACT

A follow-up guidance and information transfer system is disclosed for use between a control point and a moving object utilizing a laser beam generated at the control point. The incident beam is directed by a movable mirror toward the moving object and reflected therefrom by a corner cube or the like along the same path. A detector disposed in the passing zone detects direction and amplitude of deviations of the reflected beam from the path of the incident beam, and a mirror control responds to the detected signals to direct the path of the incident beam to follow the moving object.

5 Claims, 6 Drawing Figures

FOLLOW-UP GUIDANCE AND INFORMATION TRANSFER SYSTEM FOR A MOVING OBJECT ON THE GROUND USING THE LIGHT BEAM

BACKGROUND OF THE INVENTION (1) Field of the Invention

This invention relates to a follow-up guidance and information transfer system for a moving object on the ground and using the light beam, and more particularly to a follow-up guidance and information transfer system for a moving object on the ground and using the light beam, which is adapted to follow up a movable object running on the ground and project the light beam to the movable object to thereby improve the efficiency of information transfer.

(2) Description of the Prior Art

The inventor has hitherto filed U.S. patent application Ser. No. 306,591, filed Sept 28, 1981, now U.S. Pat. No. 4,488,233 (Japanese Patent Application No. 141306/1980) of the result of technical research such that a movable object on the ground, such as an unattended transport vehicle, is guided for running along the route defined by scanning the light beam.

It is necessary at present that the moving object on the ground is not only guided to travel but also transferred with various control commands, such as the speed control command, stop or start command, and destination and addresses command. Also, it is necessary to grasp and control the condition of each unit at the moving object on the ground, for example, consumption of batteries, the car number, kinds and weight of loaded goods. The light beam, however, scans on the ground to result in that the information is transferred in an extremely short time to thereby have created the problem in that the information to be transferred is limited in magnitude and the efficiency of information transfer is not improvable.

SUMMARY OF THE INVENTION

An object of the invention is to provide a route on which a moving object on the ground travels, by projecting the light beam following-up the moving object running on the ground.

Another object of the invention is to provide a follow-up guidance and information transfer system for the moving object on the ground using the light beam to thereby make it possible to transfer more information and improve the efficiency of information transfer.

This invention is characterized in that the follow-up guidance and information transfer system for the moving object on the ground using the light beam, is provided with a light-beam generating apparatus, a follow-up mirror for reflecting the projected light beam and projecting it on the route along which the moving object runs, a drive motor for rotating the follow-up mirror, a reflection means which is mounted on the moving object on the ground and reflects the incident light beam in parallel to the direction thereof, and a light-beam-sensitive detection means disposed in the passing zone of the light-beam reflected by the reflection means and outputting detected signals corresponding to variation of the spot where the light beam reaches, so that the rotation of the drive motor is controlled on the basis of the detected signals so as to allow the light beam reflected by the follow-up mirror to follow up the moving object on the ground and be projected thereon.

These and other objects of the invention will become more apparent in the detailed description and examples which follow.

DESCRIPTION OF THE PREFERRED EMBODIMENTS

Figure 1:
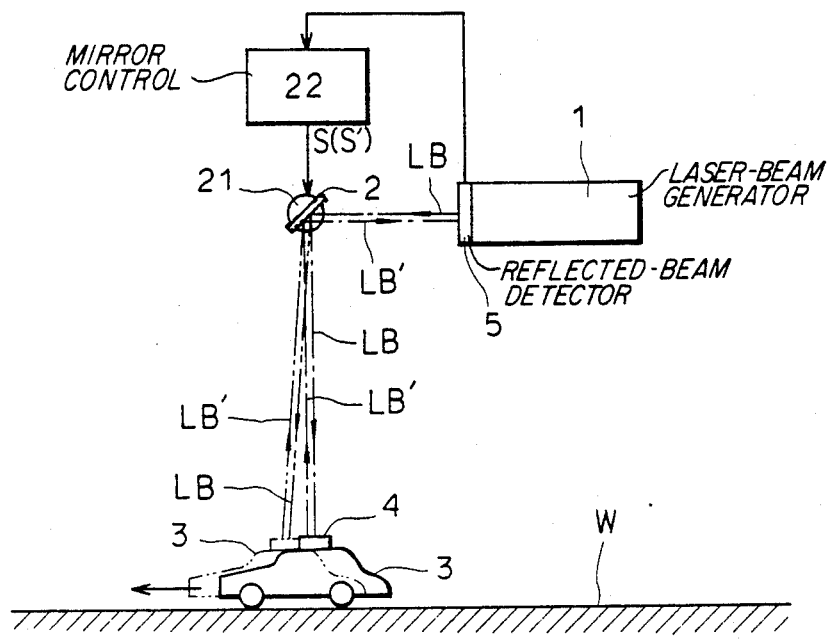
FIG. 1 is a schematic structural view exemplary of a follow-up guidance and information transfer system for a moving object on the ground of the invention.
Figure 2:
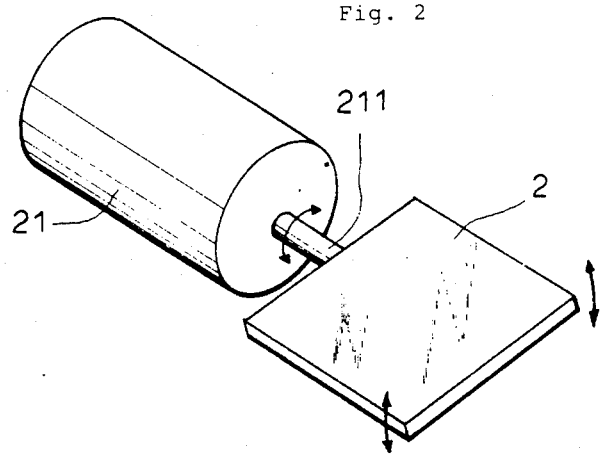
FIG. 2 is a schematic perspective view of a follow-up mirror and a drive motor.
Figure 3:
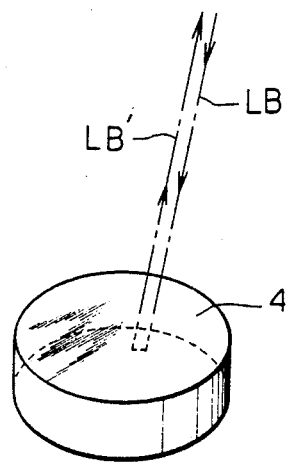
FIG. 3 is a view explanatory of a corner cube as reflection means.
Figure 4:
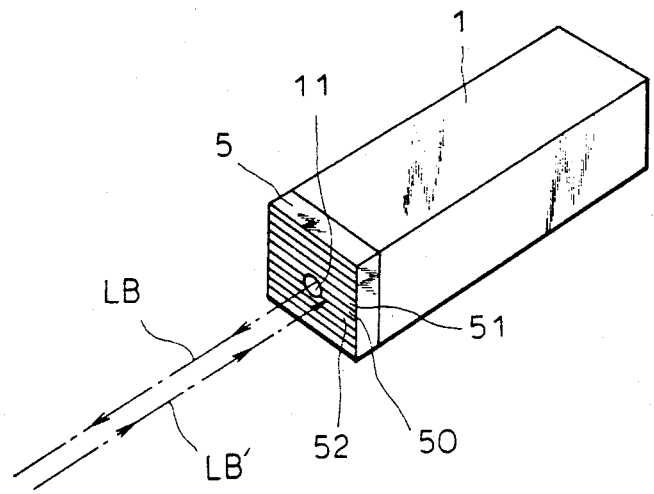
FIG. 4 is a schematic perspective view of a laser beam generating apparatus serving as the light-beam generating apparatus and a laser-beam-sensitive detector as the light-beam-sensitive detection means.
Figure 5:
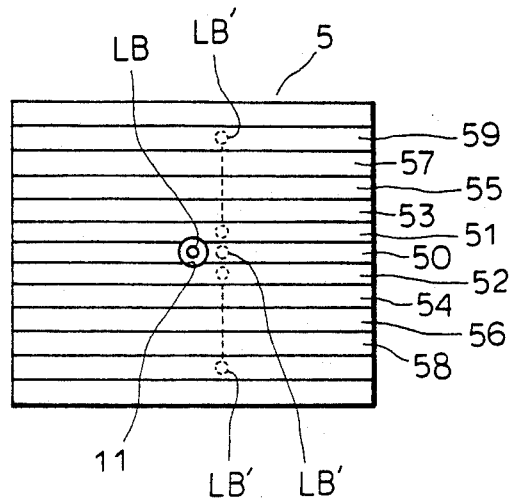
FIG. 5 is a view explanatory of arrangement of light-sensitive elements constituting the laser-beam-sensitive detector.
Figure 6:
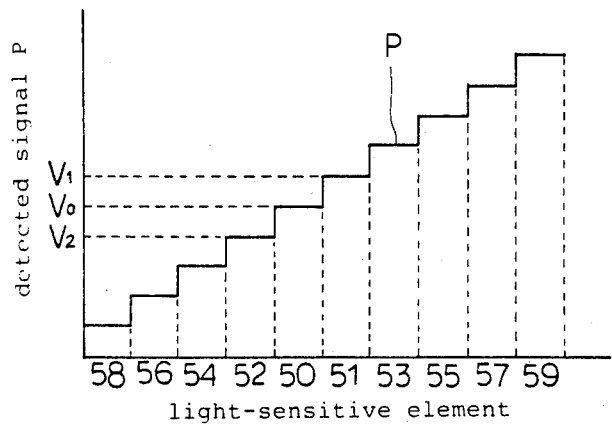
FIG. 6 is a chart of the waveform of detected signals output from the laser-beam-sensitive detector.

Referring to FIG. 1, the system of the invention comprises a laser-beam generating apparatus 1 as the light-beam generating apparatus which projects a laser beam LB from one lengthwise end of the laser-beam generating apparatus 1, a follow-up mirror 2, a corner cube 4 as reflection means mounted on a moving object 3 on the ground, and a laser-beam-sensitive detector 5. The laser-beam generating apparatus 1 is provided at the proper position above a route W on which the moving object is to run so that the laser beam LB is projected, for example approximately horizontally. The follow-up mirror 2 is formed of a rectangular full-reflection mirror, provided within the passing zone of laser beam LB so as to reflect and project it onto the route W, mounted to a rotary shaft 211 of a drive motor 21 as shown in FIG. 2, and rotates as follows: The drive motor 21 is adapted to rotate upon being given a normal rotation signal S or a reverse rotation signal S', from a mirror control circuit 22, whereby the follow-up mirror 2 rotates normally or reversely to allow the laser beam LB reflected by the follow-up mirror 21 to move forwardly or backwardly for projection on the route W. The corner cube 4, as shown in FIG. 3, reflects the laser beam LB incident on the cube 4 so that the laser beam LB is reflected as a laser beam LB' toward the follow-up mirror 2 in the same direction as the laser beam LB, the reflected laser beam LB' being reflected by the follow-up mirror 2 to travel approximately in the same path of the incident laser beam LB and then reach the laser-beam-sensitive detector 5 provided at the one lengthwise end of laser-beam generator 1 as shown in FIG. 1. The laser-beam detector 5, as shown in FIGS. 4 and 5, comprises a plurality of light-sensitive elements 50, 51, 52 . . . 59, which comprise, for example, solar cells, are elongate-strip-like shaped that extend lengthwise horizontally and are disposed vertically side by side except for a projection orifice 11 through which the laser beam LB is projected. In a case where the reflected laser beam LB', for example, moves upwardly from the light-sensitive element 58 and reaches element 59 (see FIG. 5), the laser-beam-sensitive detector 5 is adapted to output detected signals P changing in potential at the predetermined potential difference in the order of arrangement of light-sensitive elements 50, 51 . . . 59 as shown in FIG. 6, the detected signals P being given to the control circuit 22. In a case where the detected signal P is higher in potential than $V_1$, in other words, the laser beam LB' reaches, for example, the light-sensitive element 51 corresponding to $V_1$ in FIG. 6, or the signal P is lower in potential than $V_2$, in other words, the beam LB' reaches the light-sensitive element 52 corresponding to $V_2$, the drive motor 21 is given the normal rotation signal S or the reverse rotation signal S'. Also, in a case where the reflected laser beam LB' reaches the light-sensitive element 57 or 59, or that 56 or 58, the normal rotation signal S or the reverse rotation signal S' is conveniently adjustable in magnitude corresponding to a shift from the element 50.

Upon giving the normal rotation signal S or reverse rotation signal S' to the drive motor 21, the rotary shaft 211 rotates normally or reversely to thereby rotate the follow-up mirror 2 normally or reversely, thus always allowing the reflected laser beam LB' coming from the corner cube 4 moving following the running moving-object 3 on the ground to reach the light-sensitive element 50 as shown by the two-dot chain line in FIG. 1. In this condition, the laser beam LB always reaches the corner cube 4 following-up the moving object 3 running on the route W. As a result, proper information, transfer apparatus provided in the vicinity of laser-beam generating apparatus 1 and corner cube 4 and utilizing the laser beam LB, can carry out the information transfer. In addition, when no moving object exists on the route W, the laser beam LB is adapted to be projected thereon while being scanned in the predetermined cycle period.

As seen from the above, the system of the invention is adapted to project the light beam following up the moving object on the ground running on the predetermined route, thereby providing the route on which the moving object on the ground travels, while the information transfer can be carried out for a long time, thereby being advantageous in that more information is transferrable and the efficiency of information transfer is improved.

Alternatively, the light beam is not limited to the laser beam LB, but may use an infrared ray beam or a visible light beam of course for the same purpose as the above.

Also, the laser-beam-sensitive detector 5 of course may alternatively use linear diode array or photoelectric cell CdS.

While an embodiment of the invention has been shown and described, the invention is not limited to the specific construction thereof, which is merely exemplary in the specification rather than defined.

What is claimed is:

1. A follow-up system for transfer of guidance and information between a control point and a moving object comprising:
    a light-beam generating apparatus at said control point arranged to project an incident light beam;
    a follow-up mirror in the path of said light beam arranged to reflect said incident light beam;
    a driving motor connected to said follow-up mirror and arranged to direct the path of said incident light beam;
    a light reflection means mounted to said moving object for reflecting said incident light beam in the same path as said incident beam;
    a light-beam sensitive detection means disposed in the passing zone of said reflected light beam for detecting a deviation thereof from said incident light beam path and for producing signals representative of the direction and amount of such deviation; and
    control means for controlling the rotation of said driving motor in response to said signals to move said follow-up mirror in a direction so that said incident light beam follows said moving object.

2. A system as claimed in claim 1, wherein said light-beam generating apparatus is a laser beam generating apparatus.

3. A system as claimed in claim 1, wherein said reflection means is a corner cube.

4. A system as claimed in claim 1, wherein said light-beam sensitive detection means is a laser-beam sensitive detector comprising a plurality of light-sensitive elements disposed side by side.

5. A system as claimed in claim 1, wherein said light-sensitive elements constituting said laser-beam sensitive detector are a plurality of solar cells arranged in parallel strips to detect the amount of deviation of said reflected light beam.

* * * * *